(12) United States Patent
Stringer, II

(10) Patent No.: US 9,398,416 B2
(45) Date of Patent: Jul. 19, 2016

(54) LOCATION-BASED COMMUNICATION SYSTEM AND METHOD FOR EMPLOYMENT RECRUITING OR THE LIKE

(71) Applicant: Henry K. Stringer, II, Austin, TX (US)

(72) Inventor: Henry K. Stringer, II, Austin, TX (US)

( * ) Notice: Subject to any disclaimer, the term of this patent is extended or adjusted under 35 U.S.C. 154(b) by 0 days.

(21) Appl. No.: 14/662,478

(22) Filed: Mar. 19, 2015

(65) Prior Publication Data

US 2015/0289100 A1  Oct. 8, 2015

Related U.S. Application Data

(60) Provisional application No. 61/975,173, filed on Apr. 4, 2014.

(51) Int. Cl.
*H04W 4/02* (2009.01)
*G01S 5/02* (2010.01)

(52) U.S. Cl.
CPC ............. *H04W 4/023* (2013.01); *G01S 5/0284* (2013.01); *H04W 4/021* (2013.01)

(58) Field of Classification Search
CPC ..... H04W 4/023; H04W 4/021; G01S 5/0284
USPC ......... 455/456.3, 419, 41.2, 414.1, 205, 41.1, 455/422.1, 456.1; 709/204, 217; 705/2, 705/26.72, 7.32, 7.18
See application file for complete search history.

(56) References Cited

U.S. PATENT DOCUMENTS

| 8,788,369 B2 * | 7/2014 | Puura | G06Q 20/42 455/406 |
| 2014/0280543 A1 * | 9/2014 | Murphy | H04L 51/20 709/204 |
| 2015/0174481 A1 * | 6/2015 | Tobin | A63F 13/216 463/7 |

* cited by examiner

*Primary Examiner* — Dhaval Patel
(74) *Attorney, Agent, or Firm* — Polansky & Associates, P.L.L.C.; Paul J. Polansky

(57) ABSTRACT

In one form, a non-transitory computer-readable medium comprises instructions that, when provided to and executed by a processor associated with a mobile device of a first user, cause the processor to periodically transmit a profile identifier and location information of the first user to a remote server and receive a match confirmation and a public profile associated with a second user from the remote server. In response to receiving the match confirmation, the instructions cause the processor to display at least a portion of the public profile associated with the second user on the mobile device, and query the first user about whether to open a dialog with the second user. In another form, the instructions can cause the processor to receive a profile identifier and a public profile from a second user using a location-based communication protocol supported by the mobile device.

20 Claims, 6 Drawing Sheets

LOCATION-BASED COMMUNICATION SYSTEM AND METHOD FOR EMPLOYMENT RECRUITING OR THE LIKE

FIELD

This disclosure relates generally to communication systems, and more specifically to communication systems that perform profile matching for purposes such as for employment recruiting.

BACKGROUND

Business recruiting supply chains have begun to use modern computer technology to improve the recruiting process. From the employer's perspective, the recruiting process requires sourcing talent, vetting talent, and delivering talent into the organization. An employee seeking a new opportunity may today find companies with openings and can submit his or her background information or resume/profile through electronic means such as electronic mail (EMAIL), internet job boards, social media, and the Internet. The employer may then use computer technology to store employee candidate information submitted electronically using EMAIL systems, general-purpose computer databases, or specific computer-based applicant tracking systems.

However even when using electronic collection and storage, the process for matching candidates to positions can still be long and arduous for both the employer and the employee, and ultimately time consuming, costly, and frustrating. For example, potential employment candidates may submit information about their qualifications at different times than positions within an organization become open. This mismatch in information gathering and usage creates the need for hiring managers and/or human resources professionals to search existing databases for candidates who may no longer be available for employment due to the passage of time. Thus many positions are ultimately filled or found by people looking or hiring being in the right place at the right time.

Figure 1:
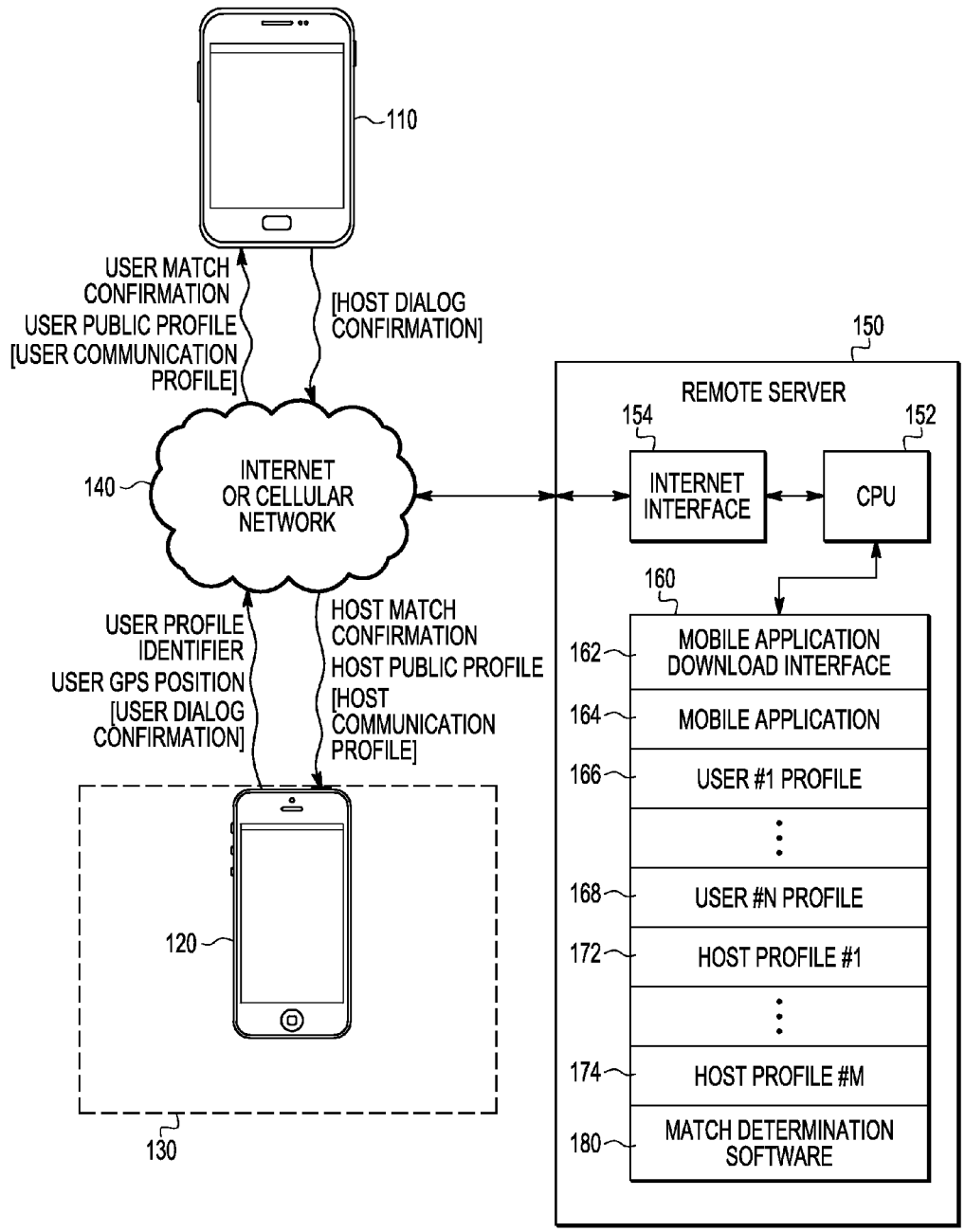
FIG. 1 illustrates a block diagram of a location-based recruiting system using a remote server protocol according to an embodiment.

In the following description, the use of the same reference numerals in different drawings indicates similar or identical items. Moreover unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

In one form, a remote server can provide a software application to a user for use on a mobile device to facilitate server-based location profile matching and communication. A non-transitory computer readable medium such as a hard disk drive, redundant array of inexpensive drives (RAID) system, etc. on the remote server includes instructions that may be provided to and executed by a processor associated with a mobile device such as a smart phone of a first user. These instructions cause the processor to periodically transmit a profile identifier and location information of the first user to a remote server, to which the mobile device is connected over the internet through, for example, the mobile device's cellular service provider. The processor receives a match confirmation and a public profile associated with a second user from the remote server. In response to receiving the match confirmation, the processor displays at least a portion of the public profile associated with the second user on the mobile device, and queries the first user about whether to open a dialog with the second user. For example, the first user may be a potential employee and the second user an employer with an open position to fill. Thus the first user is able to use his or her mobile device to find job openings based on his or her presence in a location that an employer is interested in, such as proximity to a hiring professional or recruiter or presence in a location of interest. Moreover, the employer or recruiting professional may also be present in the same location to facilitate an immediate meeting. Thus the mobile application facilitates efficient and near-immediate talent sourcing for both the employer and candidate.

In another form, a remote server facilitates a location-based profile matching process such as employment recruiting by performing profile matching between users. The remote server includes a non-transitory computer readable medium such as a hard disk drive, RAID system, etc. on the remote server. The computer readable medium includes instructions that, when provided to and executed by a processor associated with the remote server, cause the processor to receive a profile identifier and position information of a first user, such as a job applicant, from a mobile device and compare the position information with stored geofence data of a second user, such as an employer or recruiting professional. In response to a location match between the position information of the first user and the stored geofence data of the second user, the instructions cause the processor to compare a profile of the first user with a profile of the second user to determine whether there is a match, and to send a match confirmation and a public profile of the second user to the mobile device in response to the match.

In yet another form, a remote server can provide a mobile application for peer-to-peer based location profile matching and communication. A non-transitory computer-readable medium includes instructions that, when provided to and executed by a processor associated with a mobile device of a first user, cause the processor to receive a profile identifier and a public profile from a second user using a location-based communication protocol supported by the mobile device. In response to receiving the profile identifier and public profile of the second user, the processor compares the public profile of the second user with a profile of the first user, displays at least a portion of the public profile of the second user on the mobile device, and queries the first user to selectively initiate a communication between the first user and the second user.

FIG. 1 illustrates a block diagram of a location-based recruiting system 100 using a remote server protocol according to an embodiment. Location-based recruiting system 100 includes generally mobile devices 110 and 120 communicating bi-directionally and indirectly using a remote server 150 over a communication fabric 140. Communication fabric 140 may include a combination of the internet, one or more cellular networks, and one or more local communication networks commonly known as "Wi-Fi", and the like. Each mobile device may communicate over the internet using a corresponding communication link established by its mobile provider. Many mobile phones also provide the option to preferentially communicate data over Wi-Fi if such a network is available to the mobile device to reduce data traffic over the cellular network. Remote server 150 is also connected to the internet through its own internet service provider, and thus can establish a communication link with each mobile device.

Remote server 150 is a computer system that includes generally a central processing unit (CPU) 152, an internet interface 154, and a memory 160. CPU 152 operates under the control of an operating system and bidirectionally communicates with mobile devices over the internet using internet interface 154. Memory 160 may be a combination of high-speed and mass storage devices that provide non-transitory storage such as hard disk drives and RAID arrays, and includes several components and data structures that are used in the location-based employment protocol described herein. In the example shown in FIG. 1, memory 160 includes several representative portions 162, 164, 166, 168, 172, 174, and 180 that store different components.

In the example shown in FIG. 1, memory 160 stores a mobile application download interface in portion 162 and one or more mobile applications in portion 164. The mobile application download interface is a set of instructions for execution on CPU 152 that creates a user interface to allow a user to download a mobile application stored in portion 164 onto his or her mobile device. For example, the mobile application download interface may require the user to submit credit card information to pay a one-time license fee for use of the mobile application. Moreover portion 164 may store different versions of the mobile application that run on different mobile operating systems. For example, mobile device 110 may support the mobile operating system known as "Android", and portion 164 may store a version of the application that runs under the Android operating system. Moreover mobile device 120 may support the operating system known as "iOS" available on mobile devices from Apple Computer, Inc., and portion 164 may also store a version of the mobile application that runs under the iOS operating system.

Memory 160 also stores profiles for employers and potential employment candidates to be used in candidate matching. Note that the mobile application download interface can also contain instructions that interact with the mobile application running on the user's mobile device to query the user to upload information to create a profile for the user. Alternatively or in addition to the mobile device interface, memory 160 can also store a generic web-based interface accessible to the user by, for example, password protection to allow the user to enter the relevant profile information efficiently using a standard computer keyboard.

In this discussion employers are generally designated "hosts" because they are responsible for defining one or more geographical locations of interest, and employee candidates are designated "users". Portion 166 stores a profile for a representative user labeled "USER #1 PROFILE", and portion 168 stores a portion for a representative $N^{th}$ user labeled "USER #N PROFILE". Each profile may include information that represents an employee's qualifications for employment, such as education, experience, references, job location requirements, salary requirements, career interests, and the like.

In some embodiments, each user profile includes a profile identifier, a public profile, and a communication profile. The profile identifier is a tag that anonymously identifies a user profile, and allows remote server 150 to selectively retrieve the user's public profile. The public profile is the information that represents an employee's qualifications for employment, and can be used to determine whether there is a match between the position and the user's background. The public profile is information that will be used to determine a match between the position and the user's background that the employee candidate is willing to release to the potential employer anonymously, thus keeping the exchange of information confidential, anonymous and discrete until the user is comfortable disclosing it. The communication profile includes personal information such as the user's name, phone number, EMAIL address, social media identifying information, etc. that in this embodiment may only be shared with further consent.

In other embodiments, each user profile includes only the profile identifier and the public profile. In these embodiments, the public profile itself contains the communication information. These embodiments facilitate quicker direct communication between the user and the host, but with less anonymity.

Additional portions of memory 160 store information related to host profiles for various job openings posted to remote server 150. Portion 172 stores a profile for a representative host job position labeled "HOST PROFILE #1", and portion 174 stores a portion for a representative host job position labeled "HOST PROFILE #M". Note that a single employer can provide multiple profiles for different job openings. Each profile may include information that represents employer requirements, such as level of education required, amount of experience required, job location, salary range offered, and the like.

In some embodiments, each host profile includes a profile identifier, location information, a public profile, and a communication profile. The profile identifier is a tag that allows an employment candidate to direct remote server 150 to anonymously retrieve the host's public profile. The location information determines acceptable locations for the user's mobile device. In one embodiment, the location information can include geofence information. A geofence is a physical area of interest and in one embodiment may be represented by four vertices of a polygon, identified by global positioning system (GPS) coordinates that define a geographic area of interest. In another embodiment, the geofence can be a circular area having a center point, identified by its GPS coordinates, and extending outward by a certain radius. For example, a potential employer may define a geofence as being a geographical area including the Austin Convention Center, which may be hosting a job fair. Each user's mobile device periodically reports its current geographical position, and remote server 150 uses the information to determine whether the user is within a geographical location of interest to any of its hosts in any of their posted job positions. As shown in FIG. 1, if mobile device 110 is associated with the host organization and mobile device 120 is associated with a user, there will be a position match with HOST PROFILE #1 when mobile device 120 reports a position within geofence 130.

The location information in each host profile can include a single geofenced area or multiple areas, in which case a position match indicates that a user candidate is within any of the listed geofences. Alternatively, each host profile can correspond to a different geofenced area, such that a single employment position may be associated with multiple host profiles. In yet another embodiment, the geofenced area may be an area surrounding the current physical location of the host as reported by mobile device 110, in which case the match determination software uses a dynamic geofenced area.

The public profile is information that will be used to determine a match between the user's background and the position that the employer is willing to release to the employee candidate anonymously, thus keeping the exchange of information confidential, anonymous and discrete until the host is comfortable disclosing it. The communication profile includes information specific to the host such as the host's name, phone number, EMAIL address, social media identifying information, etc. that in this embodiment may only be shared with further consent.

In other embodiments, each host profile may include only the profile identifier, the location information, and the public profile, and in these embodiments the public profile itself contains the communication information. These embodiments facilitate quicker direct communication between the user and the host, but with less anonymity.

Another portion 180 of memory 160 stores match determination software that includes instructions for execution on CPU 152 that allows remote server 150 determine whether there is a match between a potential employment candidate and any posted position. The match determination software includes a location determination portion and a match portion. Remote server 150 uses the location determination portion to determine whether there is a location match.

Once the match determination software determines a location match between a host profile and a user, it further determines whether there is a profile match. There are various ways that the match determination software can determine that a profile match exists. In one embodiment, the match determination software determines a profile match when certain job requirements are exactly met and other job requirements achieve a certain degree of correspondence. For example, the employer may post a position for a financial analyst in Austin, Tex., that requires an MBA from a Tier 1 university, but the employer would accept a BA in business from Harvard, Stanford, or the University of Chicago. Alternatively the match determination software may score an MBA from a Tier 1 university as 100%, an MBA from a Tier 2 university as 50%, and a BA from a Tier 1 university as 75%. The match determination software would determine an overall match if a weighted-average of the degree of correspondence is above a threshold.

FIG. 1 also shows various communications by mobile devices 110 and 120 used in the remote server protocol. As shown in FIG. 1, after mobile device 120 launches the mobile application, it periodically reports its profile identifier and GPS position to remote sever 150. In the example shown in FIG. 1, remote server 150 compares the location information to each of the host profiles. Remote server 150 may use various techniques for processing efficiency to limit the number of host profiles that must be searched each time a user reports its GPS location. Remote server 150 uses the user profile identifier to retrieve the user profile in case there is a position match.

If remote server 150 finds a location match, it then searches all location matching host profiles for a profile match. As described above the profile match may require exact matching of some or all of the host criteria. In case of a profile match, remote server 150 sends a host match confirmation to mobile device 120 and a host public profile of the host profile identified by the profile identifier. The mobile application may be configured to run under the mobile device's operating system in a background mode, so that the user of mobile device 120 may simultaneously run one or more other applications. For example, in the case of a profile match, the mobile application may provide an alert and interrupt another active application by displaying an alert in the foreground and providing the user the option to switch to the mobile application as a foreground application. In some embodiments at this point, the host public profile will contain all information needed to implement a communication between the user and the host, including the identity of the host, the description of the opening, and the communication information.

In other embodiments, the host public profile may contain only information about the position, while keeping the identity of the host and the communication information secret. This allows the host to avoid providing too much information before the user provides additional information himself or herself. In this case, remote server 150 may require the user to send a dialog confirmation before it provides any identity information. Upon receipt of the dialog confirmation, remote server 150 may take a variety of actions, including immediately sending the user's public profile and communication profile to the host, sending both the user's public profile to the host and the host's communication profile to the user, or only sending the host's communication profile to the user. Thus system 100 provides various options for retaining the anonymity of either the user or the host until different points in time, such as when each party indicates a desire to communicate with the other.

If the host receives a user match confirmation, a mobile application running on mobile device 110 can likewise interrupt another active application and provide the option to move the mobile application to the foreground. In the case in which the user public profile does not contain communication information, the host may also be required to send a host dialog confirmation and await reception of the user communication profile and/or receive a direct communication from the user.

Location-based system 100 allows an employer to connect efficiently with a candidate. If the host defines the geofence as the area around the location of mobile device 110, then location-based system also provides the opportunity for the host to meet a qualified employment candidate quickly and in person. Thus location-based system 100 provides improved recruitment sourcing that can provide nearly immediate results and higher recruitment productivity and better time-to-fill-position ratios.

Location-based system 100 can also be used in other contexts than employment recruiting. For example a location-based system as described with respect to FIG. 1 can be used to bring buyers and sellers together. In this case, either the buyer or the seller can function as a host by defining the location of interest.

In another example, location-based system 100 can be used for dating. In this example, both mobile devices can operate as users, and can match personality and preference data of one user with personality data of opposite-sex users in the same geographic area. In this case, it may be more important to preserve anonymity until each person becomes familiar with and comes to trust the motives of each other. In this type of system, remote server 150 may facilitate this interaction by providing communication aliases to prevent the other person from obtaining too much personal information until trust is built after further interaction.

Note that when creating host profiles for use with system 100, it is important for human relations and legal professionals associated with the host organization to comply with existing laws, such as non-discrimination, etc. in creating appropriate profiles.

Figure 2:
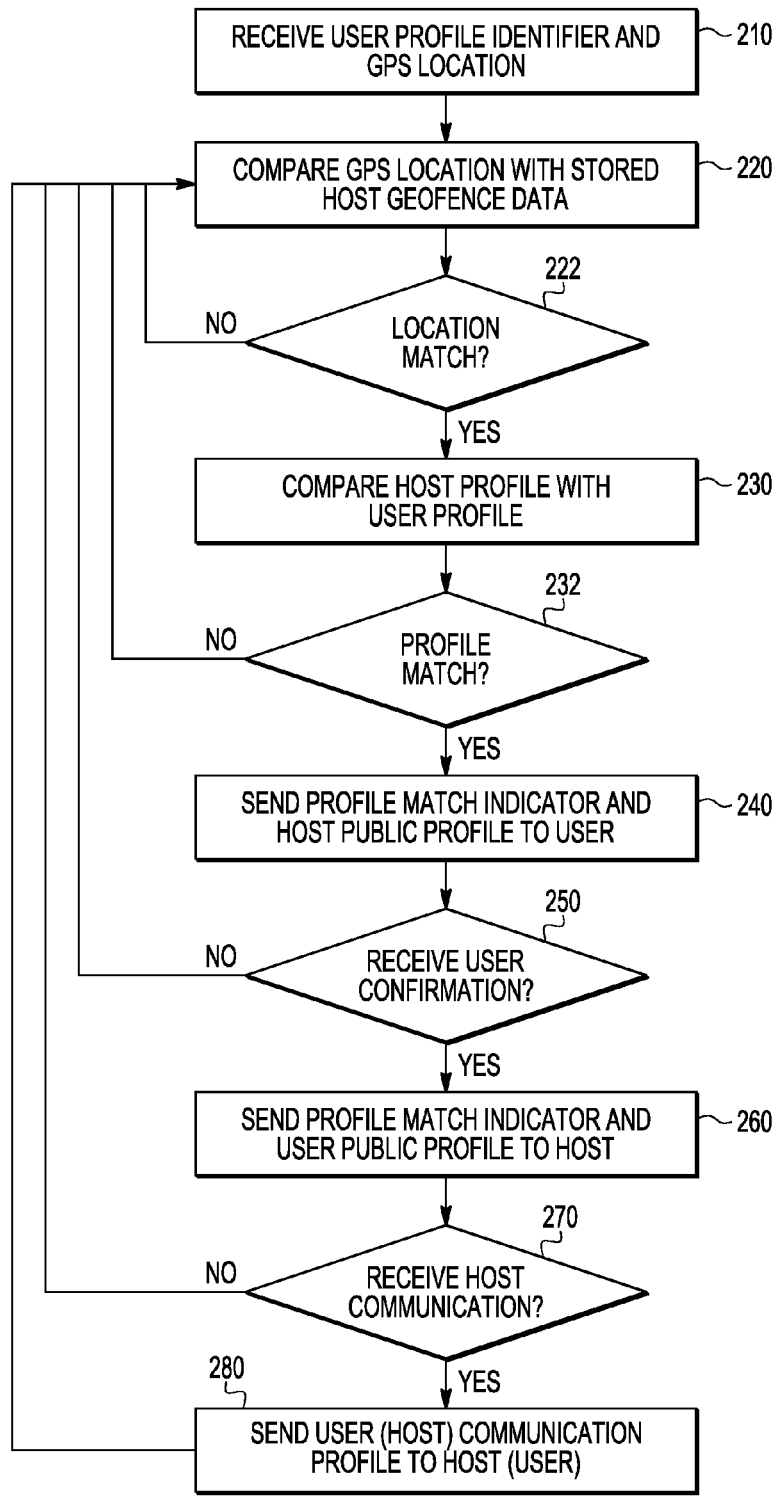
FIG. 2 illustrates a flow chart of the operation of the remote server of FIG. 1 using the server-based protocol.

FIG. 2 illustrates a flow chart 200 of the operation of remote server 150 of FIG. 1 using the server-based protocol. Flow begins in action box 210, in which remote server 150 receives a user profile identifier and GPS location from a user. Remote server 150 uses the profile identifier to associate the profile stored in memory 160 with a particular user. Then in action box 220, remote server 150 compares the GPS location with stored host geofence data. Remote server 150 may use various sorting and techniques to facilitate the efficient search through its database of host profiles in memory 160. In decision box 222, remote server 150 determines whether there is a location match with any host location data. If not, then flow returns to action box 210.

If the host detects a match between the user's GPS location and one or more host's geofence data, then remote server 150 further determines whether there is a profile match in decision box 232. As mentioned earlier, remote server 150 can determine that a profile match exists, for example, by finding an exact match of certain specified criteria and a degree of match with other criteria. If remote server 150 determines that there is a profile match, then in action box 240 it sends a host profile match indicator and the host's public profile to the user; otherwise flow returns to action box 220. Then at decision box 250, it determines whether there is a user confirmation. There are a variety of techniques that could be used to determine how remote server 150 determines there is no confirmation. For example, remote server 150 could determine that there is no confirmation if either the user explicitly declines the confirmation or a certain amount of time has passed. In remote server 150 receives the user confirmation, then in action box 260 remote server 150 sends a profile match indicator and the user's public profile to the host; otherwise flow returns to action box 220. In decision box 270, remote server 150 determines whether there is a host confirmation. As with the user's confirmation, remote server 150 can determine that there was no host confirmation if either the host explicitly declines the confirmation or a certain amount of time has passed. This amount of time may be different that the amount of time used in decision box 250. If remote server 150 receives the confirmation, then in action box 280 it sends the user's communication profile to the host and/or the host's communication profile to the user; otherwise flow returns to action box 220.

As mentioned earlier, in some embodiments remote server 150 can provide the option for direct communication once it determines there is a match with any host's profile. In this case the public profile may itself contain a communication profile and these public profiles would be exchanged with the host and/or the user immediately after decision box 232.

Figure 3:
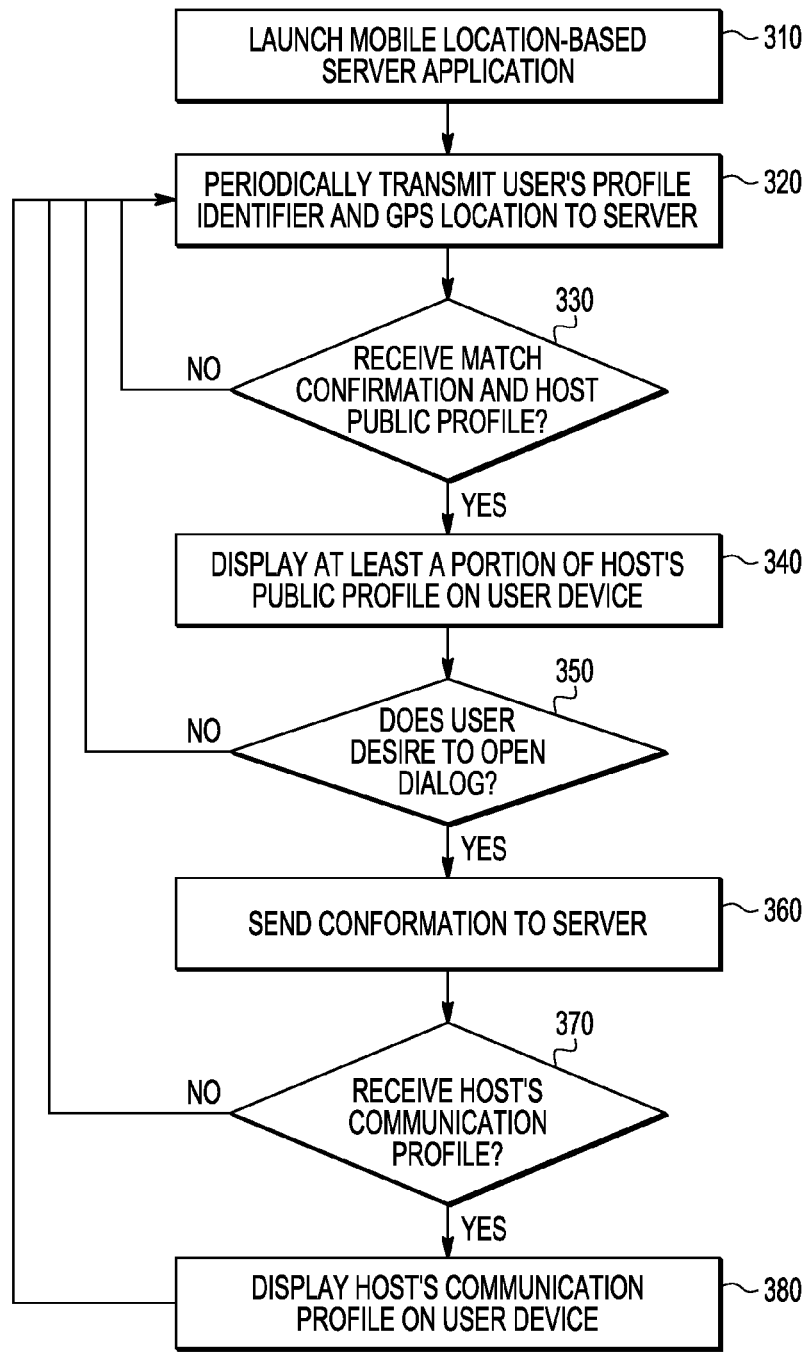
FIG. 3 illustrates a flow chart of the operation of the mobile device of FIG. 3 using the server-based mobile application of FIG. 1.

FIG. 3 illustrates a flow chart 300 of the operation of mobile device 120 of FIG. 1 using the server-based mobile application of FIG. 1. Flow begins at action box 310, in which the user launches the server-based mobile application. Mobile device 120 could keep the application in the foreground, or could switch it to a background application while the user accesses other capabilities of mobile device 120. At action box 320, mobile device 120 periodically transmits the user's profile identifier and GPS location to remote server 150. It then checks, in decision box 330, whether it has received a match confirmation and host public profile from remote server 150. If not, flow returns to action box 320. If so, then flow proceeds to action box 340 in which mobile device 120 displays at least a portion of the host's public profile on mobile device 120. In this case if the mobile application is running in the background, it provides an alert such as a dialog box in the foreground to allow the user the option to move the mobile application to the foreground and view the matching host profile. Then at decision box 350, the mobile application queries the user to determine whether to open a dialog. If the user does not desire to open a dialog with the matching host, then flow returns to action box 320 to allow the user to search for other matching host profiles. If the user desires to open a dialog with the matching host, then at step 360 mobile device 120 sends a confirmation to remote server 150, and waits to receive the matching host's communication profile at decision box 370. If mobile device 120 does not receive the matching host's communication profile, then flow returns to action box 320. The matching host can decline to exchange communication profiles explicitly, or the mobile application on mobile device 120 can time out waiting for a confirmation. If the matching host also desired to open a dialog, however, then at action box 380 the mobile application displays the host's communication profile on the display of mobile device 120, and optionally also stores it in internal memory for future retrieval, and flow returns to action box 320.

Figure 4:
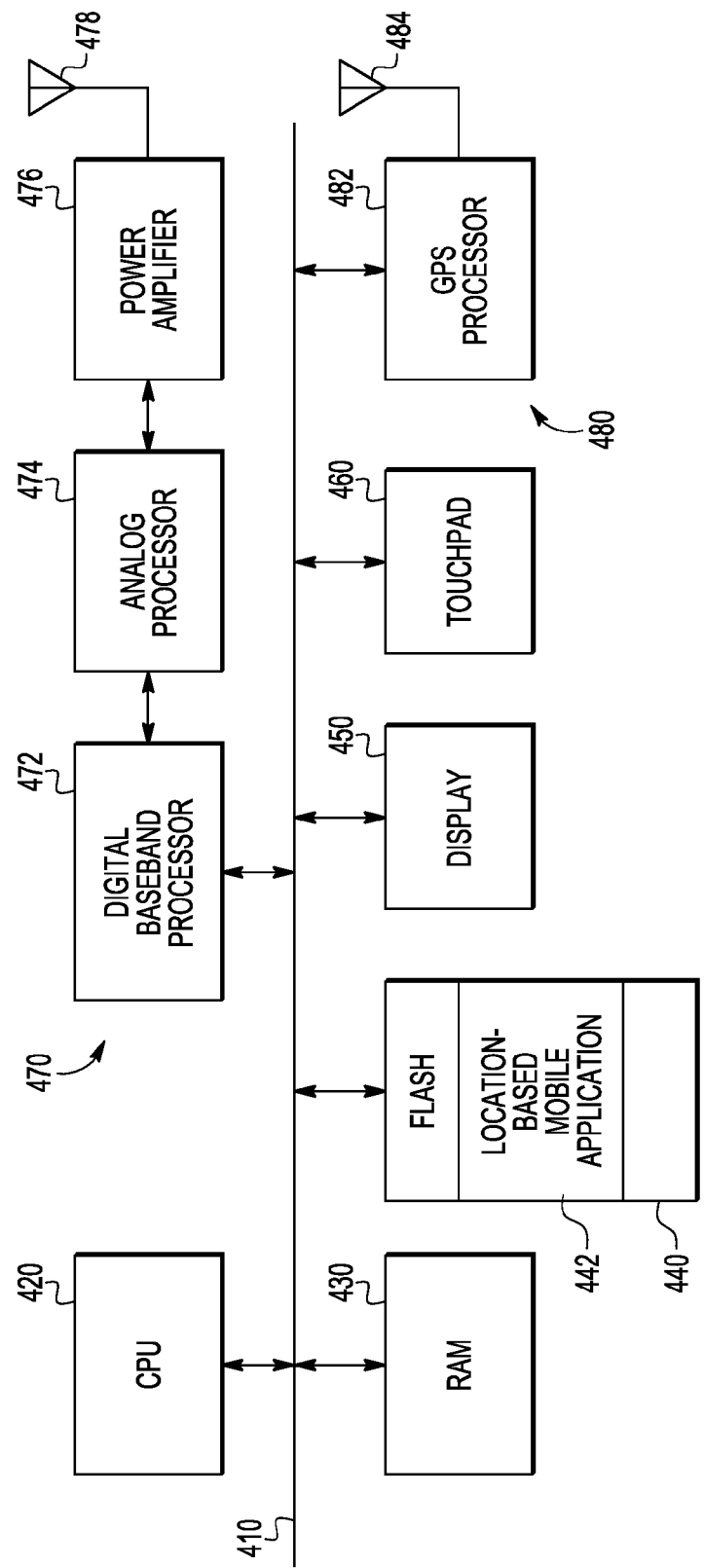
FIG. 4 illustrates a block diagram of an exemplary mobile device that can be used in the system of FIG. 1.

FIG. 4 illustrates a block diagram of an exemplary mobile device 400 that can be used in the system of FIG. 1. Mobile device 400 includes a bus 410 which electrically connects several components, including a CPU 420, a random access memory (RAM) 430, a flash memory 440, a display 450, a touchpad 460, a cellular radio section 470, and a GPS section 480. CPU 420 is bidirectionally connected to bus 410 for initiating read or write accesses to the memory and peripheral components connected to bus 410. RAM 430 is bidirectionally connected to bus 410, and is used as a high-speed memory to store working variables and perhaps portion of software for fast execution. Flash memory 440 is also bidirectionally connected to bus 410, and stores software applications and parameters as well as user data such as music, digital photographs, and applications that need to be preserved after the user powers off the mobile device. One such application is a location-based mobile application 442, which can be downloaded from remote server 150 such as described with respect to FIG. 1. Display 450 is used as an output interface device, and is typically a high-definition screen that may be, for example, about 5 centimeters (cm) by 9 cm in area. Touchpad 460 is an input device the interacts with the operating system and various applications and which display virtual keyboards, radio buttons, and the like on display 450, and is typically implemented as an invisible membrane integral with display 450 for an intuitive user interface. Cellular radio section 470 includes several components used in interfacing to the cellular or Wi-Fi network, including a digital baseband processor 472, an analog processor 474, a power amplifier 476, and an antenna 478. GPS section 480 includes a GPS processor 482 and an antenna 484. GPS processor 482 is bidirectionally connected to bus 410 and receives periodic signals through antenna 484 from a constellation of satellites that allows GPS processor 482 to determine and report location coordinates to CPU 420, which in turn provides it to remote server 150 as described above. It should be apparent that mobile device 400 is just one example and additional details and features that have been omitted from this discussion will normally be present, such as a separate WiFi interface connected to bus 410 along with a WiFi antenna.

When the user powers on mobile device 400, the mobile operating system provides the user with visual icons representing available software applications. One such application is location-based mobile application 442 stored in Flash memory 440. In one embodiment, location-based mobile application 442 will provide a user interface to allow the user to upload profile data to the remote server, receive match confirmations from hosts who have themselves set up a profile that matches the user's profile, and receive and display host profile data including the host's public profile and communication profile. In some embodiments, location-based mobile application 442 will also provide the option, once a profile has been uploaded, for the user to start sending location information along with the user's profile identifier to the server in a background mode, allowing the user to run one or more other applications or utilities on the mobile device, and then to interrupt any application currently running with a message when it receives a match confirmation from the remote server.

Figure 5:
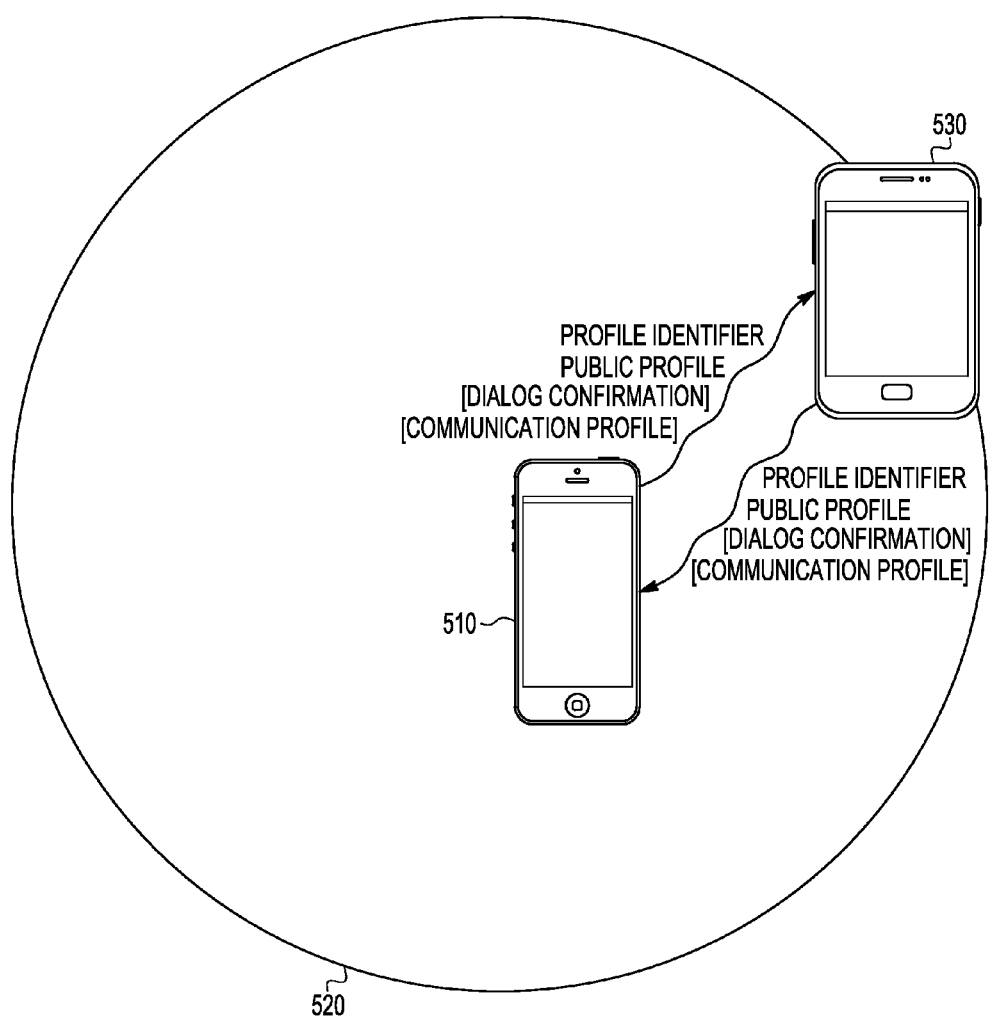
FIG. 5 illustrates a block diagram of a location-based recruiting system using a peer-to-peer protocol according to another embodiment.

FIG. 5 illustrates a block diagram of a location-based recruiting system 500 using a peer-to-peer protocol according to another embodiment. System 500 includes a mobile device 510 that has a location-based communication protocol and is able to communicate bi-directionally and directly with other devices having the location-based protocol within a certain radius defining a circle 520. The radius of circle 520 corresponds to the power of the transmitted signal under the given location-based protocol. One example of such a protocol is known as Bluetooth Low Energy (BLE), which has a transmission distance of approximately 50 meters. In system 500, a second mobile device 530 will be able to communicate with mobile device 510 when the two mobile devices enter the range of each other, for example within approximately 50 meters. In this case, the BLE technology itself determines the location match. For this example, then, each mobile device includes profile matching software similar to the software that was stored in remote server 150 for use in system 100 of FIG. 1. However information that was previously exchanged between each mobile device and the remote server in system 100 will now be exchanged directly between mobile devices in system 500, including profile identifiers, public profiles, and optionally dialog confirmations and communication profiles.

Since the communication takes place directly between two mobile devices, it creates the possibility for an unscrupulous hacker to harvest information for a nefarious purpose. Thus in this case, it may be desirable to implement the two-step option of exchanging public profiles anonymously and determining that a match exists from the perspectives of both mobile devices before exchanging personally-identifiable communication profiles. In one embodiment, the location-based mobile application would be configured to set up an anonymous peer-to-peer direct communication such as aliased SMS texting, without revealing the mobile number of the other application. This technique would prevent most users from seeing the other peer's information until both parties consent. It would also be desirable to implement end-to-end encryption using any of a variety of known data encryption techniques.

Figure 6:
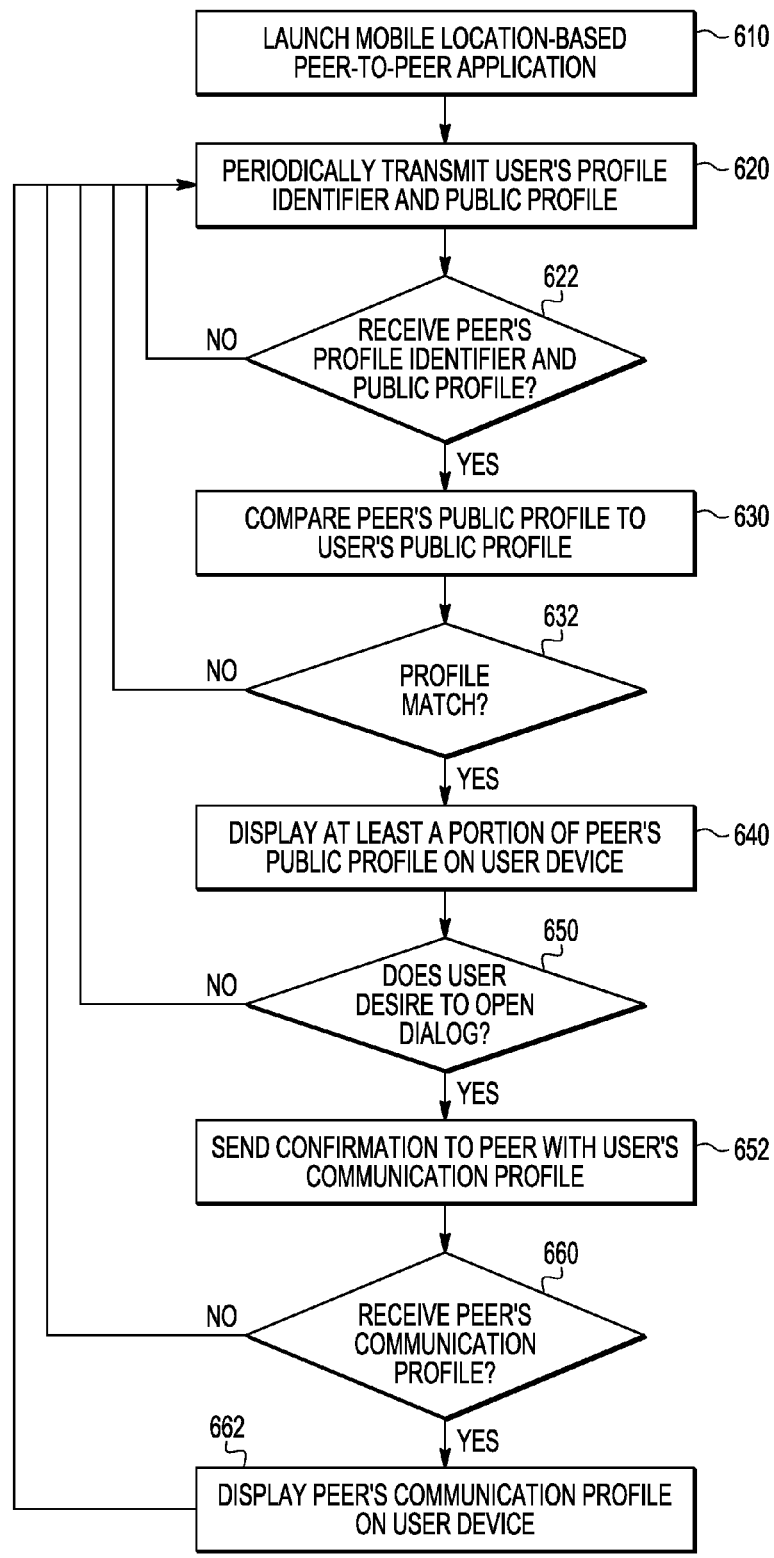
FIG. 6 illustrates a flow chart of the operation of a mobile device using the peer-to-peer protocol of FIG. 5.

FIG. 6 illustrates a flow chart of the operation of a mobile device using the peer-to-peer protocol of FIG. 5. Flow begins at action box 610, in which the user launches the location-based peer-to-peer application. As with the server-based application, mobile device 510 could keep the application in the foreground, or could switch it to a background application while the user accesses other capabilities of mobile device 510. At action box 620, mobile device 510 periodically transmits the user's profile identifier and public profile. It then checks, in decision box 622, whether it has received a peer's profile identifier and public profile from a peer using the peer-to-peer protocol, i.e. within circle 520. If not, flow returns to action box 620. If so, then flow proceeds to action box 630 in which mobile device 510 compares the peer's public profile to the user's profile. It determines whether there is a match at decision box 632. If there is no match, then flow returns to action box 620. Note that mobile device 510 may keep a record of peer profile identifiers for which it has already determined that no match exists, such that action box 622 would only need to determine whether it receives a peer profile identifier and public profile from a new peer only. If mobile device 510 determines that there is a profile match, then at action box 630 it displays at least a portion of the peer's public profile on the display. In this case if the mobile application is running in the background, it would provide a dialog box in the foreground to allow the user the option to move the application to the foreground to view the matching peer profile.

At decision box 650, the mobile application queries the user to determine whether to open a dialog. If the user does not desire to open a dialog with the matching peer, then flow returns to action box 620 to allow the user to search for other matching peers. However, the user may see the match but not be able to respond at that time. In this case, the mobile application can keep a history of matching peer profiles that can be retrieved later. However when using the additional dialog confirmation steps, the user would lose the ability to capture the peer's communication profile if the matching peer leaves circle 520. If the user desires to open a dialog with the matching peer, then at action box 652 mobile device 510 sends a confirmation to the peer with the peer's communication profile, and waits to receive the peer's communication profile at decision box 660. If mobile device 510 does not receive the peer's communication profile, then flow returns to action box 620. The matching peer can decline to exchange communication profiles explicitly, or the mobile application on mobile device 510 can time out waiting for a confirmation. In addition, the mobile application may detect that mobile device 530 has moved outside of circle 520, making further peer-to-peer communication impossible. If the matching peer also desires to open a dialog, however, then at action box 662 the mobile application displays the peer's communication profile on the display of mobile device 510, and optionally also stores it in internal memory for future retrieval, and flow returns to action box 620.

Thus a communication system for facilitating location-based profile matching as described herein leverages the widespread use of mobile devices and location-based technologies such as GPS geofencing and BLE to implement location-based profile matching and communication. It should be apparent that the communication system can be modified to operate with other similar communication technologies now in existence or that will be developed in the future. For example, other embodiments can be based on a technology known as mesh networking, which based on the IEEE 802.11s standard. An open-source application using mesh networking technology known as "Firechat" has recently been introduced for the iOS and Android operating systems. In mesh networking, a virtual network is formed by the local interconnection of nodes, in which each node relays data for the network. Since a mesh network can grow in geographical size as other nodes join the network, a mobile application based on the mesh network can use the peer-to-peer protocol and also optionally implement proximity restrictions like the server-based protocol.

The communication system described herein is especially useful in employment recruiting and redefines the recruitment supply chain. It allows employers to look for potential employment candidates either in physical proximity to a hiring professional or recruiter, or that are in geographical areas correlated to high-quality candidates, and to facilitate efficient and quick communication between candidates and potential employers. However it is also useful in other contexts in which two parties may interact in certain geographic areas and in which it is desirable to maintain anonymity during part of the process, such as commercial sales, dating, and the like. The communication system described herein provides several options to preserve anonymity until a mutual match and interest is determined, and to preserve the privacy of the communications from unwelcome observers such as hackers.

While various embodiments have been described, it should be apparent that various modifications may exist. For example, the communication system may allow users to "short circuit" the two-step process for dialog confirmation and initiate a dialog quickly after a match is detected. Moreover the data may be encrypted by the application using known encryption techniques to preserve the anonymity of the information from unscrupulous hackers. While the foregoing description has covered both a server-based application and a peer-to-peer application, a mobile application provided by the remote server may be capable of either mode of operation. Also there are various ways in which the mobile application may interact with the mobile operating system. In addition, other location-based communication protocols may be used besides BLE described above. In the host-based system, the host is also in communication via a mobile device which may be co-located with the user device inside the same geofence, which would allow for rapid communications and perhaps a face-to-face meeting. In other embodiments, the host may be located outside the fence and use the geofence data as one factor for suitability for employment, which may indicate as residence in or familiarity with the location defined by the geofence.

Accordingly, it is intended by the appended claims to cover all modifications of the invention that fall within the true scope of the invention.

What is claimed is:

1. A non-transitory computer-readable medium comprising instructions that, when provided to and executed by a processor associated with a mobile device of a first user, cause the processor to:
   periodically transmit a profile identifier and location information of the first user to a remote server, wherein the profile identifier is a tag that anonymously identifies a user profile associated with the first user and stored in the remote server;
   receive a match confirmation and a public profile associated with a second user from the remote server, wherein the public profile associated with the second user includes information about the second user that allows the second user to remain anonymous, and in response to receiving the match confirmation:
   display at least a portion of the public profile associated with the second user on the mobile device; and
   query the first user about whether to open a dialog with the second user.

2. The non-transitory computer-readable medium of claim 1, further comprising instructions that, if the first user desires to open the dialog with the second user cause the processor to:
   send a dialog confirmation that the user desires to open the dialog with the second user to the remote server;
   receive a communication profile associated with the second user from the remote server; and
   display the communication profile associated with the second user on the mobile device.

3. The non-transitory computer-readable medium of claim 1, where the location information comprises global positioning system (GPS) coordinates.

4. The non-transitory computer-readable medium of claim 1, where the profile identifier of the first user includes a user profile.

5. A remote server comprising a non-transitory computer-readable medium comprising instructions that, when provided to and executed by a processor associated with the remote server, cause the processor to:
   receive a profile identifier and position information of a first user from a mobile device, wherein the profile identifier is a tag that anonymously identifies a user profile associated with the first user and stored in the remote server;
   compare the position information with stored geofence data of a second user;
   in response to a location match between the position information of the first user and the stored geofence data of the second user:
   compare a profile of the first user with a profile of the second user to determine a match therebetween; and
   send a match confirmation and a public profile of the second user to the mobile device in response to determining the match, wherein the public profile of the second user includes information about the second user that allows the second user to remain anonymous.

6. The remote server of claim 5, wherein the instructions cause the remote server to retrieve the profile of the first user from a memory of the remote server.

7. The remote server of claim 5, wherein the profile identifier includes the profile of the first user.

8. The remote server of claim 5, further comprising instructions that, when provided to and executed by the processor associated with the remote server, cause the remote server to:
   receive a dialog confirmation from the mobile device;
   send a match confirmation and a public profile of the first user to the second user; and
   in response to receiving a dialog confirmation from the second user, send a communication profile to at least one of the first user and the second user.

9. The remote server of claim 8, wherein the communication profile comprises a telephone number.

10. The remote server of claim 8, wherein the communication profile comprises an EMAIL address.

11. The remote server of claim 5, wherein the profile of the first user comprises employment candidate data, and the profile of the second user comprises employer position data.

12. The remote server of claim 5, wherein the profile of the first user and the profile of the second user comprise personality data.

13. The remote server of claim 5, wherein the profile of the first user comprises buyer data and the profile of the second user comprises seller data.

14. The remote server of claim 5, wherein the instructions determine the match at least in part using a degree of coincidence between the profile of the first user and the profile of the second user.

15. A non-transitory computer-readable medium comprising instructions that, when provided to and executed by a processor associated with a mobile device of a first user cause the processor to:
   receive a profile identifier and a public profile from a second user using a location-based communication protocol supported by the mobile device, wherein the profile identifier is a tag that anonymously identifies a user profile associated with the first user and the public profile includes information about the second user that allows the second user to remain anonymous;

in response to receiving the profile identifier and public profile of the second user:

compare the public profile of the second user with a profile of the first user;

display at least a portion of the public profile of the second user on the mobile device; and query the first user to selectively initiate a communication between the first user and the second user.

16. The non-transitory computer-readable medium of claim 15, wherein the instructions further cause the processor to:

periodically transmit a profile identifier and a public profile of the first user using the location-based communication protocol supported by the mobile device.

17. The non-transitory computer-readable medium of claim 16, wherein the public profile of the first user does not contain communication information and wherein the instruction further cause the processor to:

send a confirmation and a communication profile of the first user to the second user if the first user indicates a desire to initiate the communication with the second user.

18. The non-transitory computer-readable medium of claim 15, wherein the instructions further cause the processor to:

prior to querying the first user selectively initiate the communication between the first user and the second user.

19. The non-transitory computer-readable medium of claim 15, wherein the public profile of the second user does not contain communication information and wherein the instructions further cause the processor to:

receive a communication profile of the second user from the second user; and display the communication profile of the second user on the mobile device.

20. The non-transitory computer-readable medium of claim 15, wherein the location-based protocol comprises the Bluetooth low energy (BLE) communication protocol.

\* \* \* \* \*